(12) United States Patent
Zafarana

(10) Patent No.: US 9,454,215 B2
(45) Date of Patent: Sep. 27, 2016

(54) POWER MANAGEMENT ARCHITECTURE BASED ON MICROPROCESSOR ARCHITECTURE WITH EMBEDDED AND EXTERNAL NON-VOLATILE MEMORY

(71) Applicant: STMicroelectronics S.r.I., Agrate Brianza (IT)

(72) Inventor: Alessandro Zafarana, Milan (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 497 days.

(21) Appl. No.: 13/907,543

(22) Filed: May 31, 2013

(65) Prior Publication Data

US 2013/0326124 A1    Dec. 5, 2013

(30) Foreign Application Priority Data

May 31, 2012    (IT) .............................. MI2012A0944

(51) Int. Cl.
| | |
|---|---|
| *G06F 1/32* | (2006.01) |
| *G06F 1/26* | (2006.01) |
| *H02J 1/08* | (2006.01) |
| *G06F 12/02* | (2006.01) |
| *G06F 12/12* | (2016.01) |

(52) U.S. Cl.
CPC .............. *G06F 1/3275* (2013.01); *G06F 1/26* (2013.01); *G06F 1/32* (2013.01); *G06F 12/0246* (2013.01); *H02J 1/08* (2013.01); *G06F 12/12* (2013.01)

(58) Field of Classification Search
CPC .................................... G06F 9/00; G06F 1/32
USPC ....... 713/300, 310, 320, 321, 322, 323, 324, 713/330, 340, 375
See application file for complete search history.

(56) References Cited

U.S. PATENT DOCUMENTS 4,138,719 A * 2/1979 Swanstrom ................ B41J 5/30
                                                                358/1.18
5,796,974 A * 8/1998 Goddard ................... G06F 8/66
                                                                712/209

(Continued)

FOREIGN PATENT DOCUMENTS

EP    2369727 A2    9/2011

OTHER PUBLICATIONS

IT MI201020944 International Search Report mailed Feb. 21, 2013, 2 pages.

*Primary Examiner* — Jaweed A Abbaszadeh
*Assistant Examiner* — Keshab Pandey
(74) *Attorney, Agent, or Firm* — Seed IP Law Group PLLC

(57) ABSTRACT

A control unit for power supply circuits of points of load (POL) of an electronic system includes a means for autonomous customization by the customer-user of the original control program residing in the ROM of the device, as well as configuration of control parameters of the POL. Microprocessor architecture of the device includes a dedicated logic block and a rewritable non-volatile memory coupled to the data bus of the device or to an auxiliary bus thereof, thus providing a means for software extension of the power supply circuits. RAM is loaded at start-up with data of modified or added routines for implementing new commands and values of configuration and control data of the POL. The RAM may optionally be subjected to encryption/decryption for protection. During operation, program execution jumps from ROM address space to RAM address space and vice versa when certain values of a program counter are reached.

20 Claims, 5 Drawing Sheets

(56) References Cited

U.S. PATENT DOCUMENTS

| | | | |
|---|---|---|---|
| 5,938,766 A | 8/1999 | Anderson et al. | |
| 6,260,157 B1* | 7/2001 | Schurecht | G06F 8/66 711/202 |
| 6,588,010 B1* | 7/2003 | Ogata | G06F 8/60 714/764 |
| 6,889,306 B1* | 5/2005 | Tani | G06F 9/268 711/103 |
| 7,000,125 B2 | 2/2006 | Chapuis et al. | |
| 7,653,757 B1 | 1/2010 | Fernald et al. | |
| 7,739,469 B2* | 6/2010 | Jessani et al. | 711/165 |
| 8,042,104 B2* | 10/2011 | Kondo | 717/168 |
| 8,504,799 B2* | 8/2013 | Han | 711/220 |
| 2003/0196096 A1* | 10/2003 | Sutton | G06F 21/572 713/181 |
| 2004/0073816 A1* | 4/2004 | Hansen | G06F 1/26 713/300 |
| 2007/0113067 A1* | 5/2007 | Oh | G06F 8/65 713/2 |
| 2007/0174680 A1* | 7/2007 | Su | G06F 8/66 714/6.13 |
| 2007/0198787 A1* | 8/2007 | Jessani | G06F 9/328 711/159 |
| 2009/0172656 A1* | 7/2009 | Landry et al. | 717/173 |
| 2010/0013304 A1 | 1/2010 | Heineman | |

* cited by examiner

POWER MANAGEMENT ARCHITECTURE BASED ON MICROPROCESSOR ARCHITECTURE WITH EMBEDDED AND EXTERNAL NON-VOLATILE MEMORY

BACKGROUND

1. Technical Field

The present disclosure relates in general to control systems of the power supply of complex electronic systems and in particular to a method of controlling a plurality of voltage regulators for as many load points of the system.

2. Description of the Related Art

A digital system for managing the power supply of complex electronic systems, briefly a PMU, acronym for Power Management Unit, is a digital unit adapted to manage programming, control, and telemetry of numerous voltage regulators deployed as load points of the electronic system (briefly POL, acronym for Point Of Load) associated thereto. Each voltage regulator or POL may include a serial digital interface, at least one synchronizing signal, a clock signal, a data transfer signal, and data signals to the PMU for accomplishing its tasks.

Implementation of the PMU consists today in a description of commands (COMMAND) customized to a specific POL that is identified with an address (ADDRESS). The serial digital interface may be proprietary (e.g., AMD and Intel) or complying to a published standard that specifies the electrical characteristics (e.g., SMBus.org). The description of the commands, depending on the vendor, may also be proprietary or they may conform to an international standard (e.g., PMBUS.org).

Nevertheless, Server developers, which on one hand have participated in the definition of the standard, may consider a core set of commands and functions indispensable but not sufficient to their own specifications and therefore the developers may add to the list of commands or to the PMBUS.org standard, specific proprietary additional commands of their systems and know-how.

A Power Management (PMU) commonly includes the set of commands and functions compliant to the International PMBUS.org standard and their specific added commands. The transmission of commands takes place according to the PMBUS protocol and is based on the physical layer of the SMBUS.org standard, and every command sent by the System Controller corresponds to an execution procedure of the standard.

In order to offer to the Server developers the possibility of extending the PMBUS commands while protecting the know-how and flexibility of developing to their software the particular requisites of their system, the adopted solution passes from a rigid hardware-type Power Management unit (PMU), to a microprocessor architecture. However, by cost concern, conventional PMU CMOS fabrication processes do not offer the possibility of implementing a re-writable non-volatile memory (EEPROM or FLASH) for containing data for executing the commands.

A power management architecture having a PMU for each POL, connected through a serial interface, is common today and described in the U.S. Pat. No. 7,000,125 (POWER-ONE, INC.) and schematically depicted in a figure of the published patent, herein reproduced as FIG. 1.

A PMU as described in the above mentioned document does not rigidly define an extended protocol with a set of redefined commands, but it does so only in a generic form in order to perform "programming" and "monitoring" of the functions of the PMU. In practice, a whole copy of the program would be necessary in RAM for permitting a re-write of part of the program to correct/adapt it to the peculiarities and necessity of one system.

A known technique, referred to as "Patch Manager," is normally applied to digital systems for catching and processing images, wherein the control application is normally executed by a microprocessor. U.S. Pat. No. 5,938,766 (APPLE COMPUTER, INC) is an example. According to this technique, in order to avoid using a RAM that is large enough to contain the entire program, the program is written in a way that it may be divided into numerous routines that are stored in ROM. This technique introduces the possibility of correcting the program executed by the microprocessor without entirely copying the program code from the ROM wherein it resides to the RAM associated with the microprocessor. A portion of the ROM contains the addresses (or symbols) of each routine of the program. The Patch Manager is aware of the set of addresses contained in ROM. At start, the Patch Manager will copy the set of addresses (pointers) to a predetermined RAM location to provide access to the routine of the program in ROM. For example, if a first routine in ROM needs to call a second routine in ROM, rather than directing execution of the program to the ROM address of the second routine, the first routine will access the predetermined address in RAM of the pointer to the second routine. Therefore, the pointer to the second routine in RAM redirects the execution to the ROM address of the second routine. An implementation of a technique of Patch Manager used in other technical sectors is found, for example, in U.S. Pat. No. 5,938,766 (Apple). In the example, the customer-user would find it impossible to correct any procedure that implements a vendor command different from those in the Power Management standard (e.g., PMBUS.org standard) without the values of the related parameters having been registered in an internal NVM and as such readable.

These related parameter values are often sensible data that qualify/disclose crucial information of the client-user technology. The example technique offers economic advantages by avoiding the need of a very large RAM, which is often not acceptable by the customer-user. Furthermore, in mixed signal silicon technology, the usage of large RAM is a relevant cost. That is, by reducing the size of RAM, a competitive advantage versus similar products in the same market field can be achieved.

BRIEF SUMMARY

To address the inconveniences discussed above, which include limitations and costs to implement control systems of supply voltage regulators employed at numerous points of load (POL) in a complex electronic system according to the conventional technique, the applicant has found an effective solution. Embodiments of the effective solution do not require the loading in RAM of the whole program to introduce corrections, modifications, and/or adaptations to the peculiar characteristics and means of one's electronic system. Embodiments also do not require a complete understanding of the communication or specific data of one's technology.

Embodiments of the novel technique include a Power Management Unit (PMU) that recognizes ADDRESS values and COMMAND values contained in a serial communication and, upon recognition of said values, the PMU executes a specific procedure of programming, control, or monitoring of the corresponding POL.

Microprocessor architecture offers remarkable advantages of flexibility and reduced design risks. Microprocessor architecture also permits a designer to create a dedicated logic block using a fast, re-writable non-volatile memory (NVM) external to the PMU device. Embodiments of the present techniques can include an internal dedicated logic block and an external memory formed as a real PMU_EXTENDER.

Besides eliminating the need of sharing certain information with the vendor, the extension can be customized entirely with a design by the customer-user. The design, which in some embodiments is downloaded on the external memory (for implementing the functional PMU_EXTENDER), may optionally contemplate data cryptation, thus avoiding the risk that sensible information on the electronic system is accessible.

For implementing this function, an encryptioning algorithm and/or an Error Correcting Code (ECC) key may be used. The encryption and/or ECC key conform to the data format of the extension downloaded from the external NVM, which will coincide with that implemented in the hardware design. In practice, even if a malware should know the hardware implementation, it will not be able to reach the firmware because it could not recognize that the extracted bytes represent Assembler code of a target CPU (e.g., INTEL CORPORATION 8051). To this end, the external NVM will have an access key to the device in order to enable the ECC control without which the download would not succeed. This key may be written in the internal NVM (which a hardware user could insert with the respective GUI), and which will coincide with the key recorded in the external NVM.

An encryption algorithm can greatly enhance protection. The encryption algorithm can be implemented in ROM and enabled or disable, and the presence of the algorithm may or may not be publicized by the manufacturer of the integrated device.

Custom extensions may thus be managed by the same user of a system that normally uses a file of symbols extracted from the ROM. For example, where the symbols are inserted at the moment of developing the program (i.e., where a table of symbols that includes at least the names and ROM addresses of the routines of the original program is generated), the table of symbols may also contain a number of added symbols capable of copying into RAM as many routines as are adapted or modified by the user. The Patch Manager can update the table of symbols for connecting an extension by modifying the program pointer. After updating the table of symbols the Path Manager may be removed, and the PMU system can function with the introduced extension in a normal manner.

Embodiments of the invention are defined in the annexed claims, which are intended to constitute subject matter of the present description and herein incorporated by expressed reference.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. One or more embodiments are described hereinafter with reference to the accompanying drawings in which.

DETAILED DESCRIPTION

Figure 1:
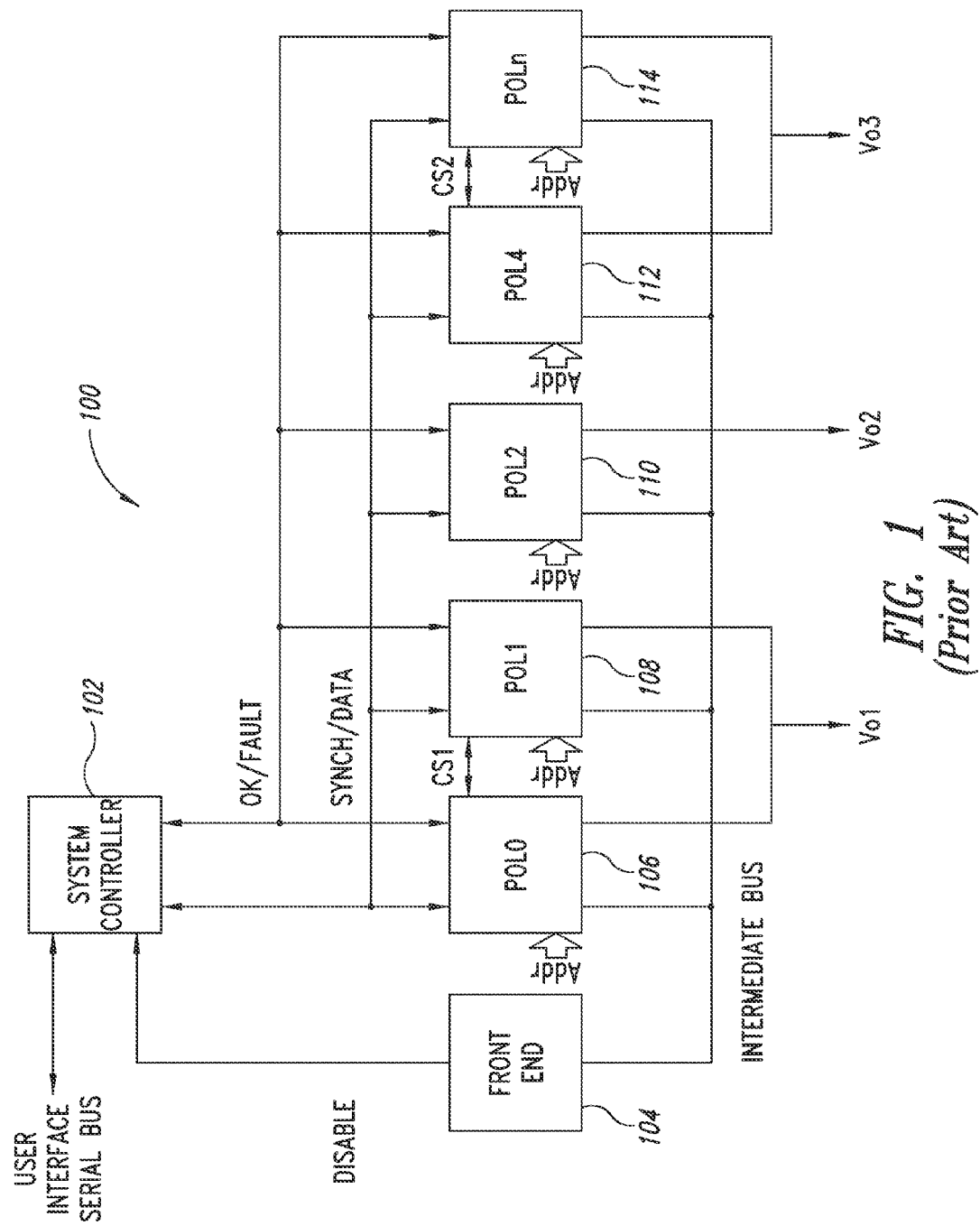
FIG. 1 is a basic schema of a PMU based on the use of a microprocessor of prior art as already discussed.
Figure 2:
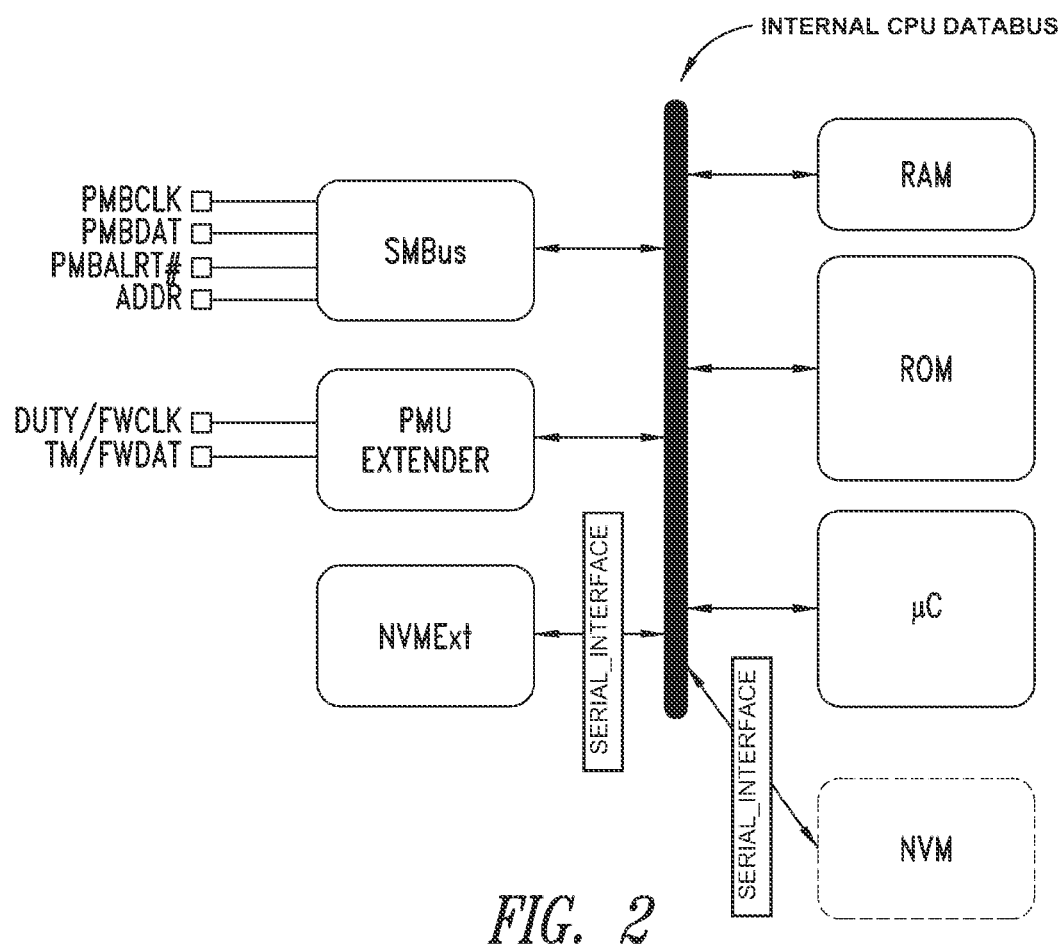
FIG. 2 shows the basic schema of an embodiment of the PMU of the present disclosure.

The strictly functional schema of FIG. 2 shows a generic sample implementation of a power management control unit (PMU) for supply voltage regulator circuits of one or many points of load (POL) of an electronic system, according to the disclosure. The fundamental elements of the embodiment of FIG. 2 include an integrated device containing a microprocessor (µC), in the considered example an 8051 CPU, system's RAM and ROM, the first logic circuit block SMBUS, a second logic circuit block PMU_EXTENDED, an internal microprocessor data bus and an interface circuit SERIAL_INTERFACE configured to make available the digital data from a rewritable non-volatile memory NVM to the CPU resources. Optionally the PMU may also include the rewritable non-volatile memory NVM, accessible by the device via said serial interface.

In more detail:

µC: is a microprocessor constituting the art of system, which acts upon a serial communication of the external data bus of the microprocessor, the serial communication having an ADDRESS value and a COMMAND value. When the ADDRESS and COMMAND values are valid and received by the logic block SMBUS, the µC executes the corresponding task or procedure.

SMBUS: is a logic circuit block that implements a logic function that translates a serial communication in byte packages. In one embodiment, for example, the logic block implements functions for the data layer of an International Standards Organization (ISO) protocol. In such an embodiment, the physical layer may be a trivial protocol (e.g., a PHILIPS ELECTRONICS N.V. I²C protocol), the packet structure compliant to the SMBUS.org specification, and the command layer a PMBUS.org protocol. The logic block SMBUS operates such that the byte packages are validly received by the microprocessor. The method with which the microprocessor receives the information may be dependent on the type of microprocessor and/or the architecture of the software executed by the microprocessor.

In one example, a condition of a valid ADDRESS value takes place in the logic block SMBUS. The logic block SMBUS releases an interrupt (IRQ) to the microprocessor that allows it to use the COMMAND as a pointer in a list of valid COMMAND routines. For each command, the microprocessor executes a . . . procedure of a routine, which represents an action to be carried out.

RAM: is a random access memory accessible by any type of microprocessor and used to temporarily store the data of a software program. Possible data may include the program itself, for example specific routines in which a whole program could may be divided. The connection of the RAM to the µC may be implemented with a suitable data bus or with a shared bus.

ROM is a dedicated read only memory containing data such as the software program executed by the microprocessor. The microprocessor steps through execution of the program through a counter called Program_Counter.

NVM: is a rewritable non-volatile memory used, for example, in commercial devices of the prior art where such devices commonly store parameters necessary to the programming and configuration of the POL. In embodiments according to the present disclosure, an NVM may optionally be present for the same purpose, in which case the NVM is a non essential feature.

PMU_EXTENDER: is a circuit block adapted to implement a function that makes possible a correction of a part or all of the program code contained in ROM to be executed by the microprocessor. In the context of this disclosure, the PMU_EXTENDER is arranged for modifying and/or increasing the number of COMMAND routines that may be executed by the PMU. The PMU_EXTENDER function includes recording in RAM two logic tables: one representing values of the Program_Counter coincident with instructions making a jump in the address space of the ROM toward corresponding addresses in RAM and vice versa; the other representing content in RAM that substitute, at that point of execution, the program code residing in ROM.

SERIAL_INTERFACE enacts the coupling with an external peripheral integrated device.

NVMext is an external rewritable non-volatile memory storing the two tables.

Preferably, hardware programming may be implemented at system start-up (Boot), at the search ("Patch Enable") function of the external memory NVMext, through the serial interface (which may not necessarily be an $I^2C$ protocol for a Serial Peripheral Interface (e.g., MOTOROLA SPI) protocol, or for some other protocol). The logic function of the serial interface translates from serial to bytes the information gathered from the external memory NVMext.

Optionally on enhanced protection, the translated data could be subject to encryption to prevent that information on one's system from being usefully extractable from the NVMext. In such a case, the logic function implemented by the PMU_EXTENDER may include a decryption key written in ROM or externally provided, for example through the logic block SMBUS. If the size of the RAM allows it, even the second table maybe completely downloaded in RAM or, on the execution of the procedures of the software program code of each command, be downloaded from the external memory NVM "in distinct pieces" when necessary.

Figure 3:
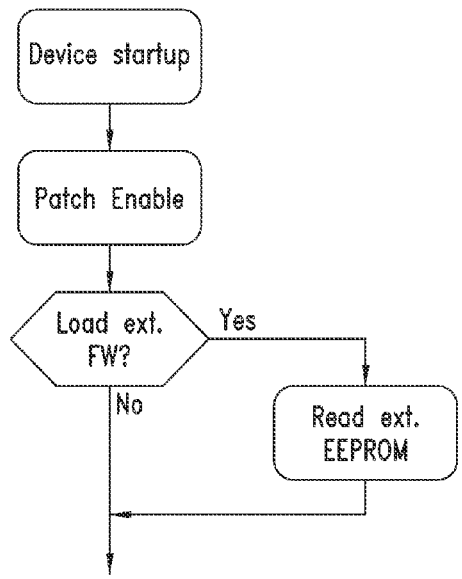
FIG. 3 shows the enabling schema of the logic block PMU_EXTENDER at system start-up.

As schematically depicted in FIG. 3, if the external memory NVM is found, its content is downloaded in RAM, including the two tables described above, and the PMU is arranged to carry out the adaptations or extension on the commands executed by the PMU.

EXAMPLE

Figure 4:
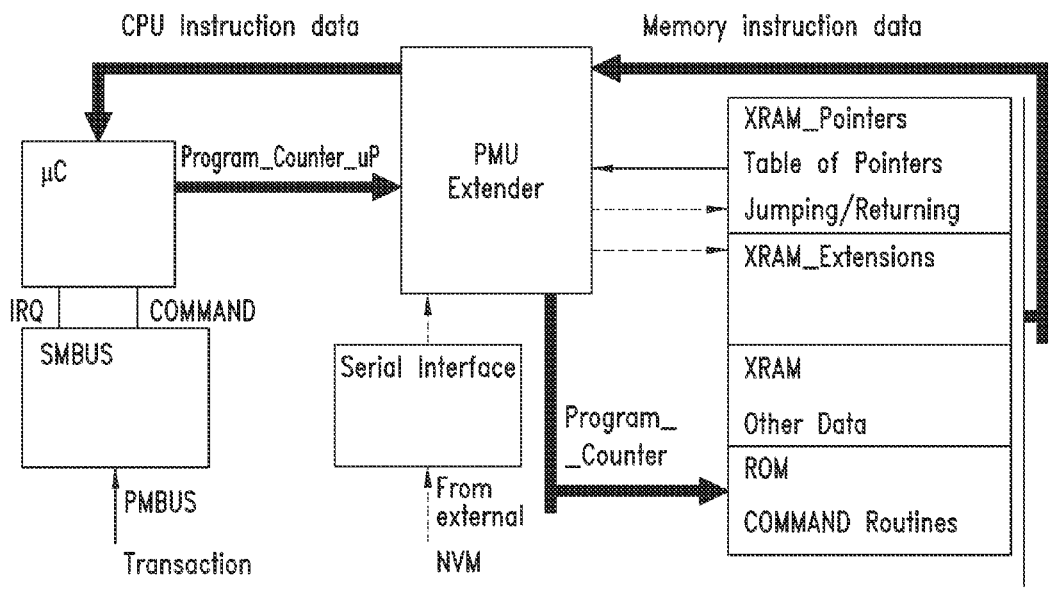
FIG. 4 is a basic schema of an embodiment of the PMU of the present disclosure.
Figure 5:
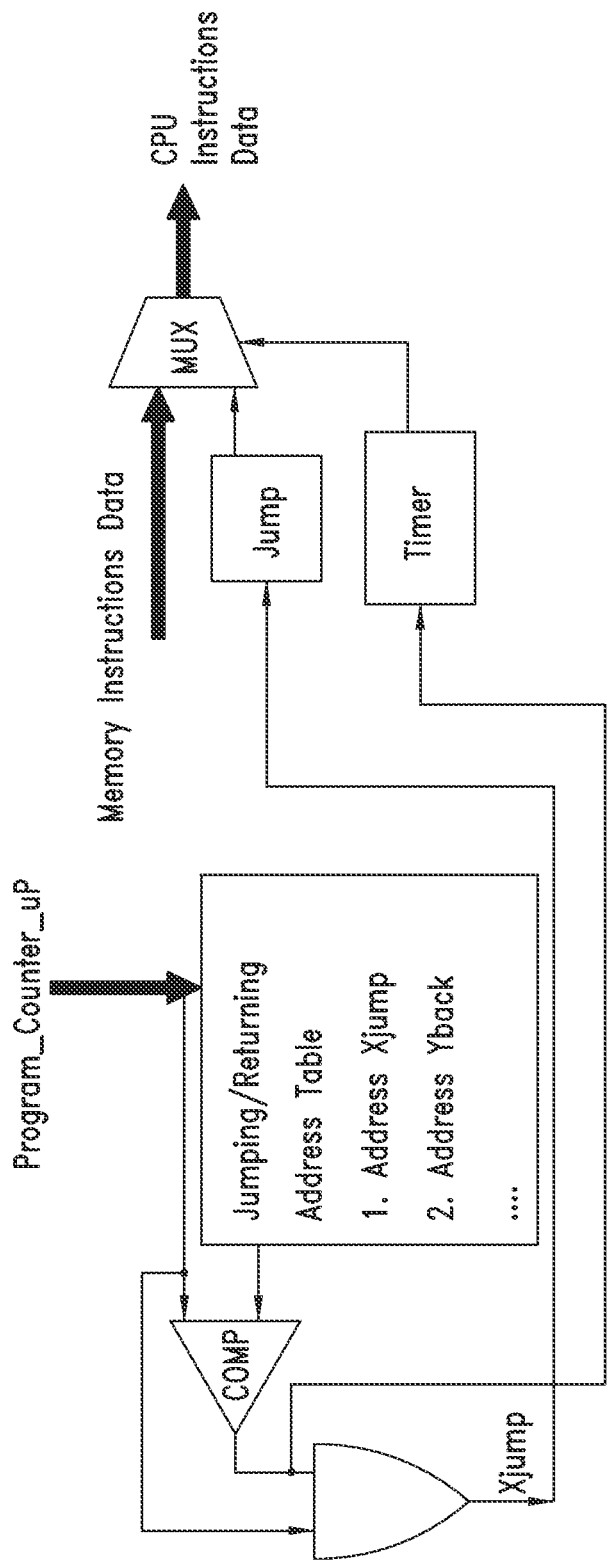
FIG. 5 is an exemplary basic circuit diagram of the logic block PMU_EXTENDER.

With reference to the schema of a possible embodiment of FIG. 4, at start-up, the logic function of the block PMU_EXTENDER is enabled. An exemplary basic circuit in FIG. 5 depicts a scheme through which two tables are serially downloaded from an external memory NVMext. The serial path, together with data from the external memory which is translated in bytes, fills the pointer table XRAM_Pointers and the extension table XRAM_Extensions in a predetermined order. The extension table XRAM_Extensions represents the program code written by the custom-user which is executed for correcting or extending the PMBUS commands towards the respective POL.

Downloading of data from the external memory NVMext maybe subject to an integrity check of data (parity bit, sum check) and to encryption.

The data of the tables are optionally released after integrity control and decrypting have been tested. The data stream at start-up is indicated with a hatched line in the schema of FIG. 4.

When the microprocessor μC executes a program, the program code is downloaded from the ROM, and the pointer to the memory containing the program data is updated. The pointer "Program_Counter" is illustrated in FIG. 4 as pointing to the ROM in case the program resides only there, however, the pointer can point to both ROM and RAM in case the two memories share the same address space.

A table of pointers XRAM_Pointers is in practice the list of addresses of the program memory (e.g., ROM alone or ROM and RAM) from which the Program Counter redirects the execution (jumping address) and to which the Program Counter continues execution of the program (returning address). The list of addresses of the program memory $XRAM_{13}$ Extension are pointers to which the Program_Counter is directed.

When the system controller senses and optionally verifies a PMBUS command, the SMBUS peripheral controls the ADDRESS, passes the serial transmission of the byte of the respective command COMMAND, and generates an interrupt IRQ to the microprocessor (μC).

The microprocessor uses the command information as a program pointer (Program_Counter_μP) for executing a routine corresponding to the received command. The PMU_EXTENDER compares the program pointer (Program_Counter_μP) with the table of pointers XRAM_Pointers in the Jumping Address list. If the PMU_Extender does not find a matching address, it leaves the Program_Counter remaining unchanged. The executed routine is effectively the original (the routine present in ROM) and the Program_Counter_μP is incremented upon evolution of the microprocessor Clock.

If the PMU_Extender finds a match with a jumping address, it loads the Program_Counter with the Returning_Address and therefore redirects the execution of the program, for example from an extension routine copy in XRAM_Extensions. The Program_Counter is incremented upon evolution of the microprocessor Clock.

According to the possible embodiment, the Program_Counter_μP may be set to a new value of the Program_Counter, which was set by the PMU_EXTENDER. The Program_Counter_μP is set by inserting data in the data stream from the RAM/ROM, which reaches the microprocessor. That is, the microprocessor executes in the program (Instruction Data), an instruction of Jump to the address given by the Returning Address. This will force the Program_Counter to said Returning Address.

The Jump instruction is common in every microprocessor; and is considered in an example embodiment (e.g., a 8051 microprocessor). In the example, the Jump instruction includes one byte and the memory address to jump to includes two bytes. Therefore the PMU_EXTENDER introduces three bytes in the instruction data in order to force the Program_Counter.

The mechanism allows a user to modify some routines of commands or to add new routines. That is, the user can add a new command not present in ROM of the commercial device, (i.e., a command where the Program_Counter_μP does not have any physical correspondence in ROM). In this case, the extension will have a jumping address toward a routine present in RAM at the location identified by the Returning Address.

It is also possible to substitute even a single program instruction such as the attribution of a certain value to a variable.

For example consider addresses from 100 to 500 as address space accessible by the Program_Counter in ROM and consider addresses from 1000 to 2000 as the address space of extensions in XRAM_Extensions. Further consider the pointer table being loaded with the following values: 150/1100; 1200/152. Then consider the case where the system controller sends a PMBUS command number 127.

The μC loads the Program_Counter_μP with the value 127. The Program_Counter_μP and the Program_Counter coincide and both are incremented by the evolution of the CLOCK.

When the Program_Counter_μP=150, the PMU_EXTENDER loads the Program_Counter with the value 1100.

The program is executed by the RAM from the location 1100 and the Program_Counter evolves with the CLOCK until reaching the value 1200. At this point, the PMU_EXTENDER detects the value 152, redirecting the execution of the program back into ROM. In practice, two instructions of the μC in ROM (the 150 and 151) are substituted with 100 instructions in RAM (from 1100 to 1199).

Figure 6:
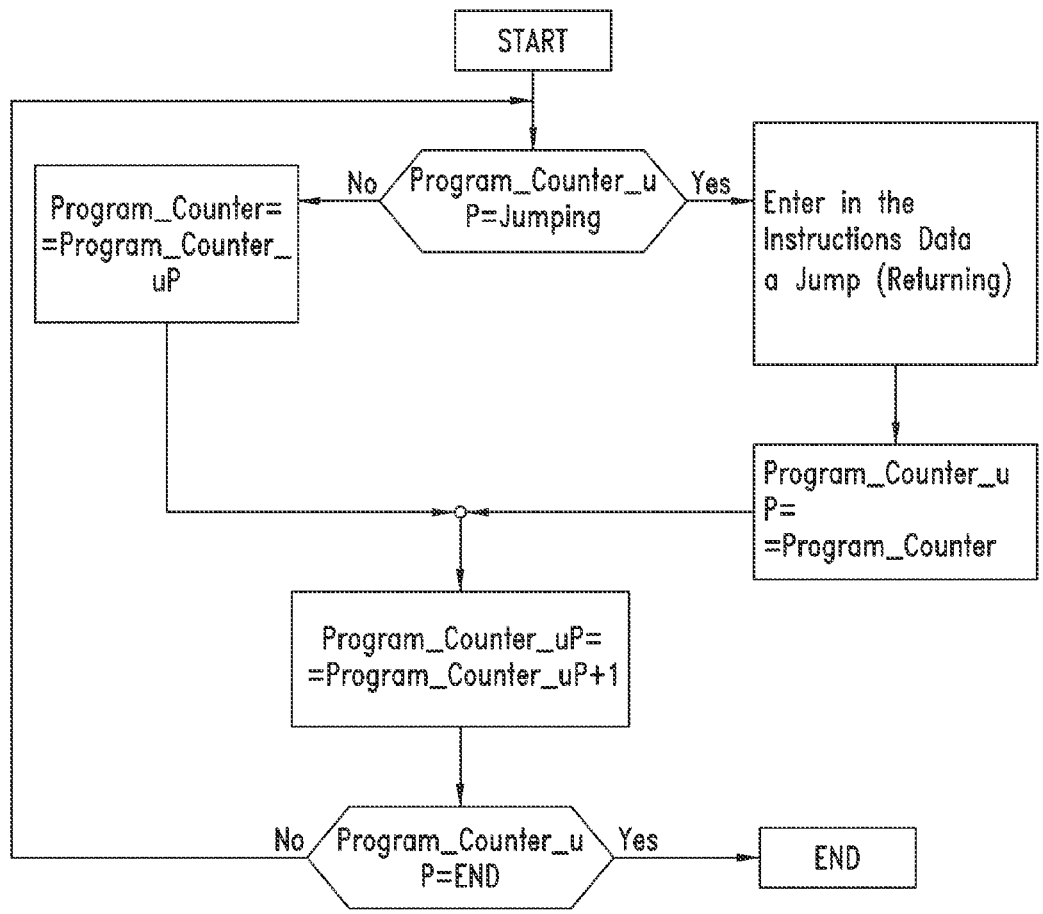
FIG. 6 shows a diagram implemented by the PMU of FIG. 4

FIG. 6 shows the flowchart implemented by the PMU of FIG. 4.

The various embodiments described above can be combined to provide further embodiments. The embodiments may include structures that are directly coupled and structures that are indirectly coupled via electrical connections through other intervening structures not shown in the figures and not described for simplicity. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control unit for supply voltage regulating circuits of one or more points of load of an electronic system, comprising:
   a microprocessor;
   a random access memory (RAM) configured to temporarily store data associated with the execution of a program by the microprocessor;
   a read only memory (ROM) configured to store data of an original software program of the control unit, the original software program executable by the microprocessor according to instructions sequenced with a program counter;
   a serial communication interface configured as a peripheral to the microprocessor;
   a first logic circuit block adapted to translate packets of serial data, the packets of serial data including operative information transmitted to the microprocessor;
   a rewritable non-volatile memory coupled to the control unit via an internal bus, the rewritable non-volatile memory configured to store data of a substitute software program to replace data of said original software program, the substitute software program configured to add or modify at least one of:
      a command executable with an associated software procedure initiated via a communication protocol of the control unit between a supply voltage regulating circuit of a point of load and a microprocessor, and
      a programming parameter arranged to configure a respective supply voltage regulating circuit of a point of load; and
   a second logic circuit block adapted to copy into a table in RAM said substitute software program data configured to add or modify at least one of a command and a programming parameter, said second logic circuit block further adapted to implement a jump from address space of said original software program in ROM toward an address in said table in RAM or vice versa when the program counter reaches a certain value, the second logic circuit block including a second program counter configured to sequence through instructions of the original software routine and the substitute software routine, wherein the second logic circuit block is arranged to sequence through instructions of the substitute software program when the program counter reaches the certain value, and the second logic circuit block is arranged to sequence through instructions of the original software program when the program counter does not reach the certain value.

2. The control unit of claim 1, wherein at start-up of the electronic system, said second logic circuit block is arranged to write two logic tables in said RAM: one table representing values of the program counter which effect a jump from the address space in ROM towards a corresponding RAM address and vice versa, and the other table representing addressable content of the substitute software program at a point of execution of the original software program residing in said ROM.

3. The control unit of claim 1, wherein extension data downloaded to said rewritable non-volatile memory is formatted according to a formatting implemented in a hardware design of the control unit, and said rewritable non-volatile memory is configured to store a control unit access key adapted to enable an integrity check, the control unit access key identical to a key written in a second internal rewritable non-volatile memory.

4. The control unit of claim 1, wherein at least some data contained in said rewritable non-volatile memory is encrypted and said second logic circuit block includes a decryption key written in ROM or provided to the control unit via said first logic circuit block.

5. The control unit of claim 2, wherein said second logic circuit block includes a hardware programming circuit adapted to enable a search of said rewritable non-volatile memory via said serial communication interface at start-up of the electronic system, the hardware programming circuit further adapted to copy the two logic tables into RAM.

6. The control unit of claim 1, wherein the serial communication interface conforms to a data layer of an ISO protocol, a physical layer of an I2C protocol, or a command layer of PMBUS.org protocol.

7. A power management unit extender module, comprising:
   a microprocessor interface, the microprocessor interface including a program counter input and an instruction data output wherein a microprocessor coupled to the microprocessor interface is configured to serially receive power management transaction information including an address value and a command value;
   a memory interface configured to provide access to a table of jump values, an original software routine executable by the microprocessor, and a substitute software routine executable by the microprocessor;

comparing logic configured to compare a power management jump value from the microprocessor to at least one value in the table of jump values;
a power management unit extender program counter configured to sequence through instructions of the original software routine and the substitute software routine,
wherein the power management unit extender program counter is configured to sequence through instructions of the substitute software routine when the comparing logic detects a match between the power management jump value from the microprocessor and a value in the table of jump values, and the power management unit extender program counter is configured to sequence through instructions of the original software routine when the comparing logic fails to detect a match between the power management jump value from the microprocessor and any values in the table of jump values, the microprocessor interface configured to pass the sequenced instructions via the instruction data output.

8. The power management unit extender module of claim 7, wherein the original software program implements a control program for a supply voltage regulator circuit of at least one point of load of an electronic system.

9. The power management unit extender module of claim 7, wherein the microprocessor coupled to the microprocessor interface is configured to serially receive the address and command information from a logic block that conforms to an SMBUS.org protocol.

10. The power management unit extender module of claim 7, wherein the memory interface is configured for coupling to a random access memory (RAM) to access the table of jump values, a read only memory to access the original software routine, and a rewritable non-volatile memory to access the substitute software routine.

11. The power management unit extender module of claim 7, wherein the power management jump value is an address and the table of jump values is a table of addresses, and wherein when the comparing logic detects a match between a starting address of the original software routine and a value in the table of jump values, a starting address of the substitute software routine is loaded into the power management unit extender program counter.

12. The power management unit extender module of claim 7, comprising:
a serial interface, the serial interface configured to receive instructions of the substitute software routine, the instructions of the substitute software routine storable in memory via the memory interface, wherein the receipt of instructions of the substitute software routine causes the power management unit extender module to update the table of jump values to include values corresponding to the substitute software routine.

13. The power management unit extender module of claim 12, comprising:
a security module, the security module configured to decrypt data received via the serial interface.

14. A power management method to control a supply voltage regulator circuit of at least one point of load of an electronic system, comprising:
loading, with a power management extender module, a table of jump values into a first rewritable memory;
loading, with the power management extender module, a substitute software routine into a second rewritable memory;
serially receiving a power management transaction with a microprocessor, the power management transaction including address value information and command value information;
receiving, by the power management extender module, a program counter input from the microprocessor, the program counter input representing commencement of a power management command;
comparing the program counter input to at least one value in the table of jump values, and based on the result of the comparison, performing the acts of:
when the program counter input matches a value in the table of jump values, loading a power management unit extender program counter with a start address of the substitute software routine, sequencing through instructions of the substitute software routine wherein the instructions are passed to the microprocessor for execution, and loading the power management unit extender program counter with a return address; or
when the program counter input does not match any values in the table of jump values, loading the power management unit extender program counter with a start address of an original software routine.

15. The power management method of claim 14, wherein the first rewritable memory and the second rewritable memory are the same non-volatile rewritable memory.

16. The power management method of claim 14, wherein the power management transaction conforms to an SMBUS.org protocol.

17. The power management method of claim 16, comprising:
detecting the power management transaction;
asserting an interrupt to the microprocessor; and
in response to the interrupt, passing the program counter input representing commencement of the power management command to the power management extender module.

18. The power management method of claim 14, comprising:
serially receiving, with the power management extender module, instructions of the substitute software routine, the instructions of the substitute software routine;
decrypting the instructions of the substitute software routine; and
updating the table of jump values to include values corresponding to the substitute software routine.

19. The power management method of claim 14, wherein the tables of jump values includes pointers to a plurality of substitute software routines, the plurality of substitute software routines arranged to increase the number of command routines that are available for execution.

20. The power management method of claim 19, wherein the pointers in the tables of jump values are arranged in cooperative first pairs and second pairs, a first pair including the program counter input representing commencement of a power management command and the start address of the substitute software routine, a second pair including the end address of the substitute software routine and a return address.

* * * * *